United States Patent
Zhang

(10) Patent No.: US 11,384,895 B1
(45) Date of Patent: Jul. 12, 2022

(54) PROTECTIVE CASE WITH A DEPLOYABLE STAND

(71) Applicant: iBenzer Inc., College Point, NY (US)

(72) Inventor: Lina Zhang, Bayside Hills, NY (US)

(73) Assignee: iBenzer Inc., College Point, NY (US)

( * ) Notice: Subject to any disclaimer, the term of this patent is extended or adjusted under 35 U.S.C. 154(b) by 0 days.

(21) Appl. No.: 17/686,912

(22) Filed: Mar. 4, 2022

Related U.S. Application Data

(60) Provisional application No. 63/291,279, filed on Dec. 17, 2021.

(51) Int. Cl.
  *A45C 11/00* (2006.01)
  *F16M 11/20* (2006.01)

(52) U.S. Cl.
  CPC ......... *F16M 11/2021* (2013.01); *A45C 11/00* (2013.01); *A45C 2011/003* (2013.01); *A45C 2200/15* (2013.01); *F16M 2200/08* (2013.01)

(58) Field of Classification Search
  CPC ......... B65D 5/52; B65D 5/5206; A45C 11/00; A45C 2011/003; A45C 2200/15; F16M 2200/08; F16M 11/2021
  USPC .......................... 206/320, 45.2, 45.23, 45.24
  See application file for complete search history.

(56) References Cited

U.S. PATENT DOCUMENTS

| | | |
|---|---|---|
| 7,001,088 B2 | 2/2006 | Hui-hu |
| 8,820,525 B1 | 9/2014 | Zanxiang |
| D763,855 S | 8/2016 | Poon et al. |
| 10,698,452 B2 | 6/2020 | Fenton et al. |
| 2012/0199501 A1* | 8/2012 | Le Gette ............... H05K 5/03 206/45.24 |
| 2013/0313142 A1 | 11/2013 | Wen |
| 2018/0041237 A1* | 2/2018 | Mody ............... H04M 1/04 |
| 2019/0018449 A1* | 1/2019 | Fenton ............... G06F 1/166 |
| 2019/0227595 A1* | 7/2019 | Ferren ............... F16M 11/041 |
| 2020/0162120 A1* | 5/2020 | Poon ............... G06F 1/1626 |
| 2020/0397105 A1* | 12/2020 | Kim ............... A45C 11/00 |
| 2021/0227960 A1* | 7/2021 | Carnevali ............... A45F 5/10 |

OTHER PUBLICATIONS

TopEsct 10.2 inch Kids case tor New Ipad 2020/2019 iPad 8th/7th Generation,Heavy Duty Built in Pencil Holder Shockproof Protective Case Cover with Kickstand and Strap for ipad 8th/7th Gen 10.2" Date First Available Jun. 28, 2020; Site visited Mar. 4, 2022; Available from Internet link: https://www.amazon.com/TopEsct-Generation-Shockproof-Protective-Compatible/dp/B083J5C1KR/ref=sr_1_11?crid=2SF7M44ZIPW29&keywords=ipad%2Bcase%2Btopesct&qid=1644243800&sprefix=ipad%2Bcase%2Btopesct%2Caps%2C95&sr=8-11th=1.

\* cited by examiner

*Primary Examiner* — Rafael A Ortiz
(74) *Attorney, Agent, or Firm* — iPA & iPM

(57) ABSTRACT

A case to protect and to support a device at various viewing angles is disclosed. The case comprises a recess on a backside to house a stand assembly, which transitions between a collapsed configuration and a plurality of deployed configurations. The base of the recess comprises a flexible island with a slit gap encircling a majority of its circumference. The stand assembly can be secured at a plurality of locations via tension between its sliding member and the island. A plurality of receiving slots can be configured onto the top surface of the island to further enhance stability. The stand assembly encompasses a range of operation between 0 to 175+ degrees from a completely collapsed to a fully extended configuration.

18 Claims, 9 Drawing Sheets

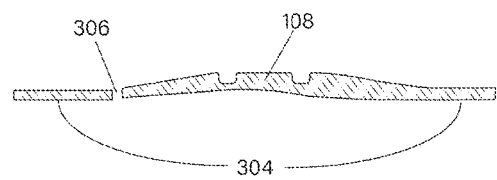
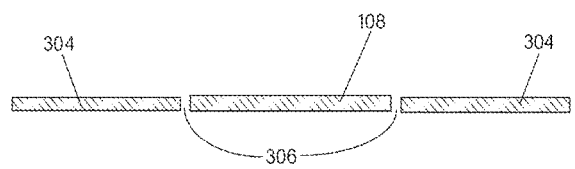
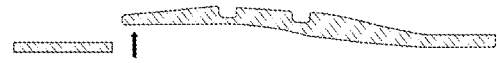
*Fig. 8a*  *Fig. 8b*
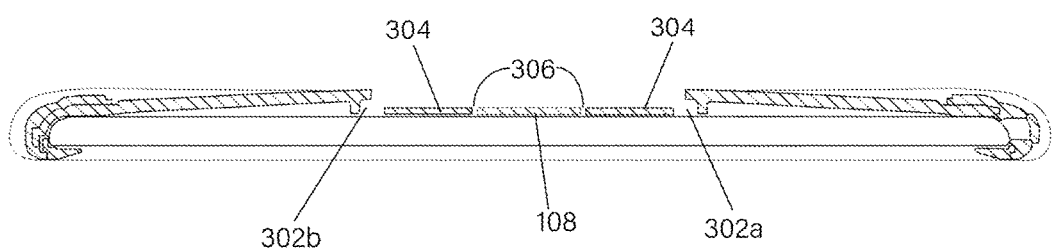
*Fig. 9* ns to zero, and both members are housed within the recess. In the plurality of deployed configurations, the end portions of the upper edge of the first member slide along the side walls so that a central portion of the upper edge transitions among a plurality of receiving positions over the island.

PROTECTIVE CASE WITH A DEPLOYABLE STAND

CROSS-REFERENCES TO RELATED APPLICATIONS

This application claims priority to an U.S. Provisional Application No. 63/291,279 filed on Dec. 17, 2021, which is hereby incorporated herein by reference in its entirety. A U.S. Design patent application No. 29/819,925 was filed on Dec. 17, 2021, with an outside view of one of the embodiments among the present disclosure. The design application is currently pending examination at the USPTO, and has not been published as of the filing date of the present non-provisional utility application.

TECHNICAL FIELD

The present disclosure, in some embodiments thereof, relates to a mechanism to secure and to adjust a stand, so that a surface protected and supported by the stand can be viewed at various angles. More specifically, the present specification discloses a case with an adjustable stand assembly for a portable computing device.

BACKGROUND OF THE DISCLOSURE

Portable computing devices such as a tablet or a phone often needs to be oriented properly and propped up securely for viewing with comfort. Various types of support, such as a pop socket, can be attached to a protective case for this particular purpose. The present disclosure is for a stand assembly that is configured as part of the case intrinsically. No additional attachment is needed. In a fully collapsed configuration, the stand assembly nestles within a recess on a backside of the case. In an opened configuration, the stand assembly offers a range of operation encompassing 0 to slightly over 175 degrees. The case and the deployable stand disclosed in the present specification can easily be repurposed for protecting and viewing objects other than a computing device.

BRIEF SUMMARY OF EMBODIMENTS

The present disclosure, in some embodiments thereof, relates to a mechanism to secure and to adjust a stand, so that a surface protected and supported by the stand can be viewed at various angles. More specifically, the present specification discloses a case with an adjustable stand assembly for a portable computing device.

In a variant, the protective case comprises a protective rim configured to enclose and to capture at least a portion of an object's main body and its perimeter. A recess is configured on a backside of the case to house a stand assembly, which transitions among a completely collapsed configuration and a plurality of deployed configurations. The stand assembly comprises a first member with an upper edge encompassing an entire width of the recess. Two end portions of the upper edge are configured to latch onto and slide within corresponding tracks along both sidewalls of the recess at a first region. A second member is rotatably coupled with the first member and is rotatably anchored onto sides of the recess at a second region opposing that of the first. The recess further comprises an island situated around a central region along its base surface, with a slit gap encircling a majority of the island's circumference. In the completely collapsed configuration, rotational angle between the first and second mem- In another variant, the slit gap encircles a majority circumference of the island, separating it from the base surface of the recess, except at a preset location where the island is connected to the base surface of the recess.

In yet another variant, the island takes a profile of a mound with a preset thickness in its central region greater than that of the base surface of the recess, and gradually tapers thin towards its edges.

In still another variant, the plurality of receiving positions are configured in shapes of receiving slots, the receiving slots are in parallel to one another, as well as in parallel to the upper edge of the first member of the stand assembly.

In a variant, the upper edge of the first member of the stand assembly further comprises a snap with a profile in complimentary to that of the receiving positions.

In another variant, the first and second members of the stand assemble are coupled to rotate with respect to one another via a shaft.

In yet another variant, the second member of the stand assembly further comprises a handle.

In still another variant, the stand assembly encompasses a range of operation between 0 to 175+ degrees from a completely collapsed to a fully extended configuration.

Other features and aspects of the disclosure will become apparent from the following detailed description, taken in conjunction with the accompanying drawings, which illustrate, by way of examples, the features in accordance with embodiments of the disclosure, The summary is not intended to limit the scope of the disclosure, which is defined solely by the claims attached hereto.

BRIEF DESCRIPTION OF DRAWINGS

The present disclosure, in accordance with one or more various embodiments, is described in detail with reference to the following figures. The drawings are provided for purposes of illustration only and to merely depict typical or example embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale.

Some of the figures included herein illustrate various embodiments of the disclosure from different viewing angles. Although the accompanying descriptive text may refer to such views as "top," "bottom" or "side" views, such references are merely descriptive and do not imply or require that the disclosure be implemented or used in a particular spatial orientation unless explicitly stated otherwise.

FIG. 8a illustrates a portion of a sectional view of a flexible island along a sagittal plane.

FIG. 8b illustrates a portion of a sectional view of a flexible island along a transversal plane.

FIG. 9 is a sectional view along a transversal plane (along line 9-9 in FIG. 3) of the case illustrating an island with spacing on both sides.

The figures are not intended to be exhaustive or to limit the disclosure to the precise form disclosed. It should be understood that the disclosure can be practiced with modification and alteration, and that the disclosure be limited only by the claims and the equivalents thereof.

DETAILED DESCRIPTION OF EMBODIMENTS OF THE DISCLOSURE

The description and/or disclosure that follow comprise illustrative systems, methods, techniques, sequence instructions, and computing machine program products that embody illustrative embodiments. In the following description, for purpose of explanation, numerous specific details are set forth in order to provide an understanding of various embodiments of the inventive subject matter.

From time-to-time, the present disclosure is described herein in terms of example environments. Description in terms of these environments is provided to allow the various features and of the disclosure to be portrayed in the context of an exemplary application. It will be evident, however, to one of ordinary skill in the art how the disclosure can be implemented in different and in alternative environments, with or without specific details. In general, well-known instruction instances, protocols, structures, and techniques have not been shown in great detail.

Unless defined otherwise, all technical and scientific terms used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present disclosure, in some embodiments thereof, relates to a mechanism to secure and to adjust a stand, so that a surface supported by the stand can be viewed at various angles.

Figure 1:
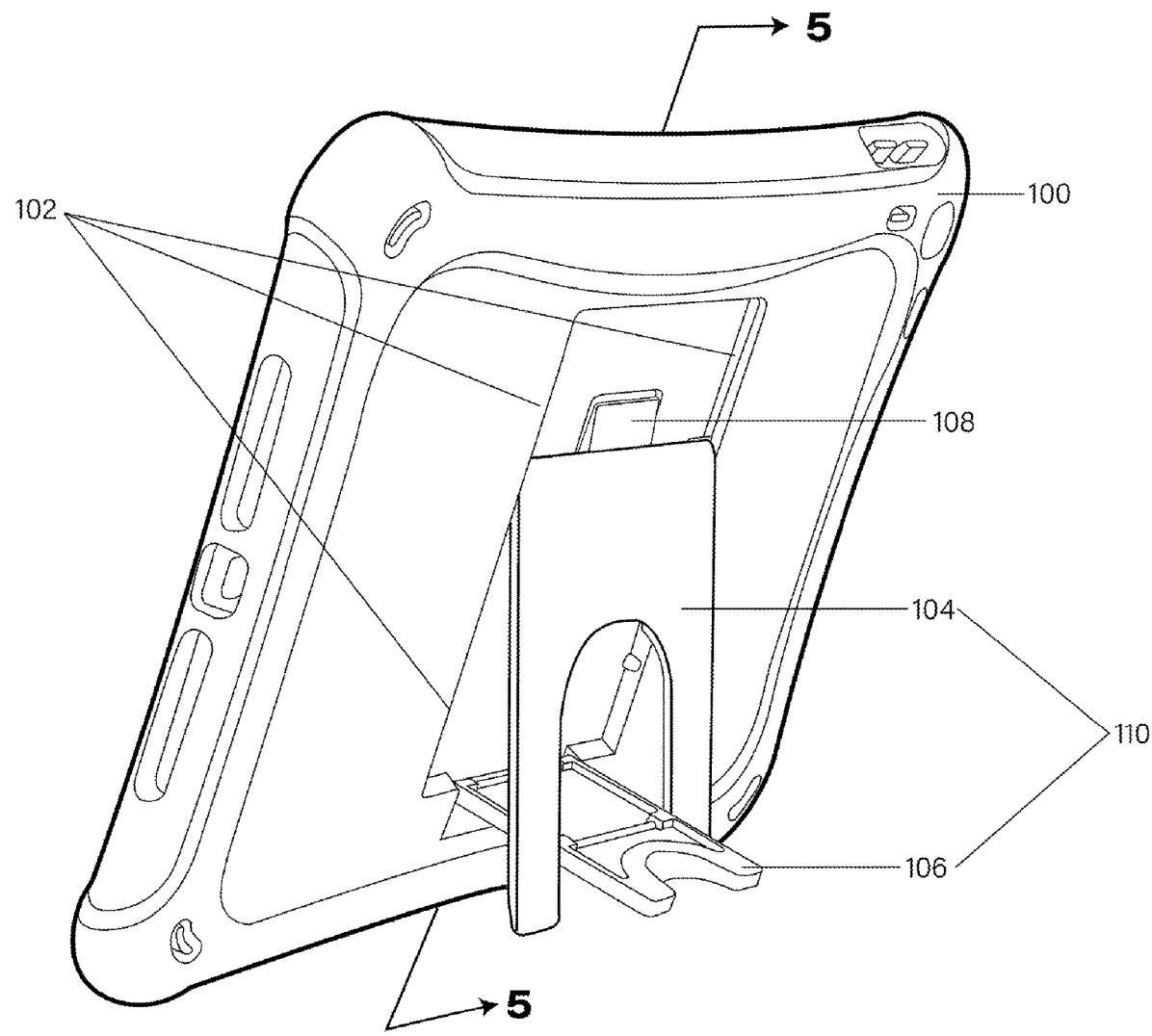
FIG. 1 is a perspective view of a case with a stand in an opened and secured position.
Figure 2:
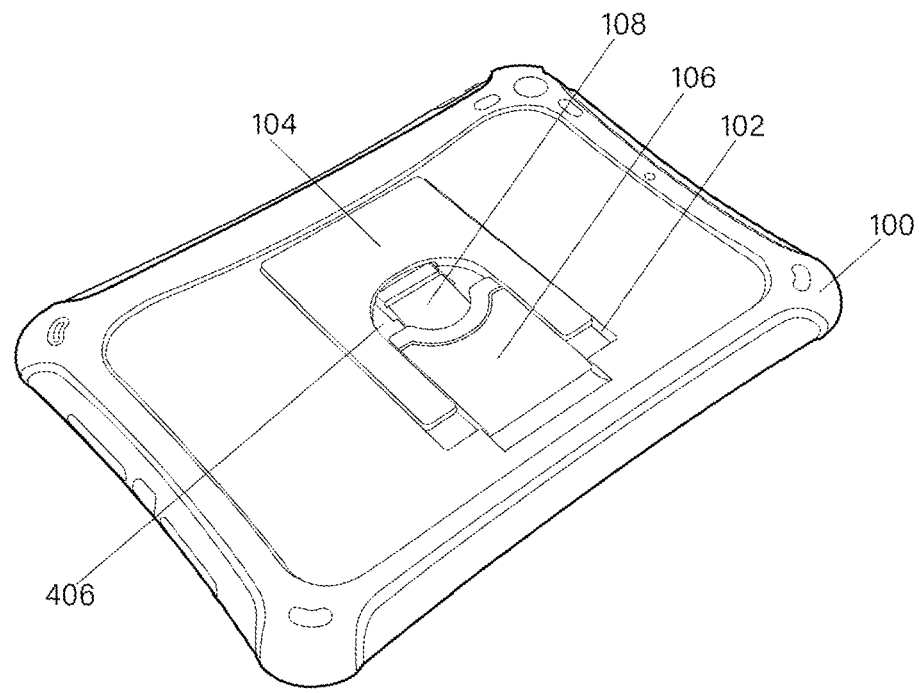
FIG. 2 is a perspective view of a case with the stand in a completely closed position nestled within a recess on a backside of the case.

FIGS. 1-4 illustrate several perspective views of a first embodiment of a case and a stand assembly, with components in combination or in isolation thereof. FIG. 1 illustrates a perspective view of a case, or a protective sleeve, 100 from behind, according to some embodiments of the present disclosure. A housing region 102, in a form of a recess, is configured onto the back surface of the case 100. A stand assembly 110, comprising a first member 104 set at an angle with a second member 106, supports the case. The first and second member of the stand can rotate with respect to each other. FIG. 2 illustrates an instance where an angle of rotation between the two members approaches 0 degree, and they become coplanar to one another. The second member 106 is largely enclosed within an arch region 406 of the first member 104. We refer to the state of the stand assembly as closed or fully collapsed, in this configuration. Length, width, and depth of the housing recess 102 are configured to compliment and to enclose the stand assembly 110 in a collapsed configuration. The outer surface of the stand assembly in FIG. 2 sits flush with the rest of the back surface of the case 100.

Figure 3:
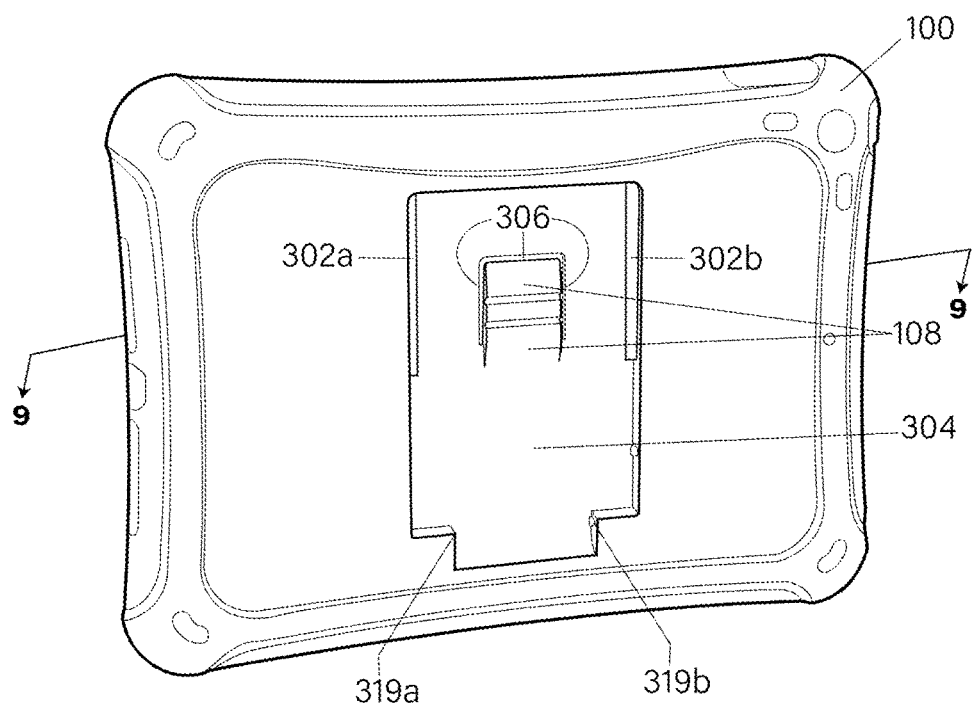
FIG. 3 is a perspective view of the recess on a backside of the case with the stand removed.

FIG. 3 illustrates a perspective view of the housing recess 102 with the stand assembly 110 completely removed, exposing its base surface 304. A pair of narrow and elongated tracks 302a and 302b is configured along sides of the housing recess 102 on the base surface 304. An island (or peninsular) 108 extends or bulges out of a central region from the base surface 304. The island comprises a preset thickness greater than that of the base surface 304. Although at least a portion of the island 108 flows out as a natural extension of the base surface 304, it is largely surrounded by a slit gap 306. Gap 306 allows the island 108 some flexibility to make small movements, forward and/or backward, so as to deviate from a coplanar position with the base surface 304. Details and cross sections will be illustrated in a later section.

Figure 4:
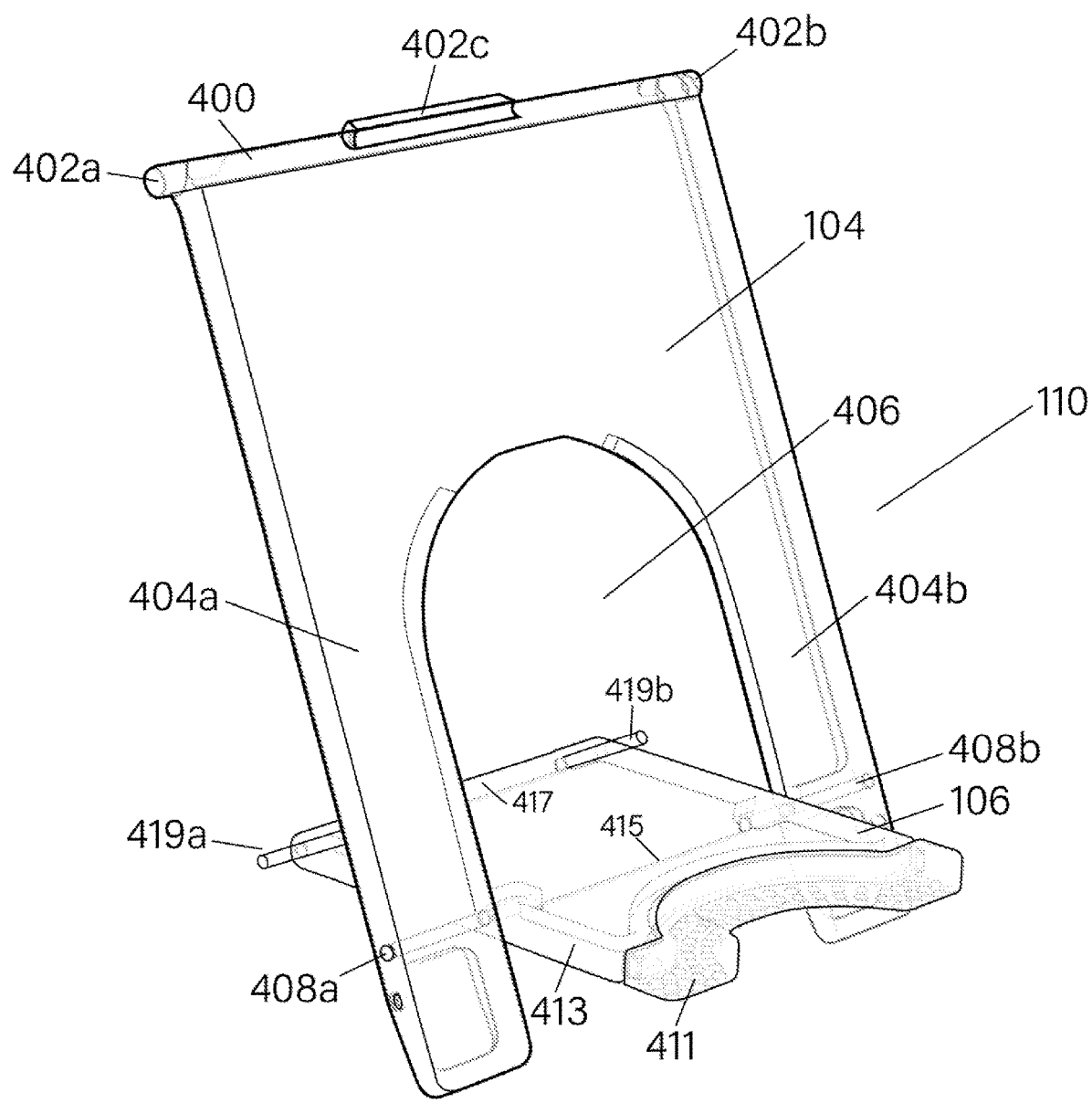
FIG. 4 is a perspective view of the stand in an opened position by itself.

FIG. 4 illustrates the stand assembly 110 on its own. Transparency is introduced to show inner structures with greater details. Transparency of the stand assembly, or of the case, is not a limiting factor, and can be modified for esthetic purposes. First member of the stand assembly 104 comprises a main body and two leg portions 404a and 404b extending away to form an arch region 406. Second member 106 of the stand assembly is largely enclosed between two leg portions of the first member 104. Both members are connected at and are configured to be able to rotate with respect to each other along coaxial shafts 408a, 415, and 408b. Second member 106 also comprises a pair of pegs 419a and 419b, which are rotatably anchored onto the sides of the recess housing 102 at base locations 319a and 319b respectively (FIG. 3). Second member 106 can be configured as a single piece 413 or with an extended handle portion 411. The handle portion 411 is designed to facilitate the operation of the stand assembly by hand. An exemplary configuration is shown in FIG. 4 with a bend or an indentation to allow some space for a finger. Texture can also be implemented to improve grip.

Top edge 400 of the first member 104 of the stand assembly further comprises two pegs 402a and 402b on both ends. These two pegs are fitted into tracks 302a and 302b (FIG. 3), and are able to slide up and down the entire length of the tracks. When the handle portion 411 is lifted upwards or downwards, rotational movements are initiated around shafts 415 and 417, and in turn push pegs 402a and 402b along their respective tracks in translational movements. The stand assembly 110 returns to a closed configuration when the angle between the two members approaches 0 degree, as shown in FIG. 2

Figure 5:
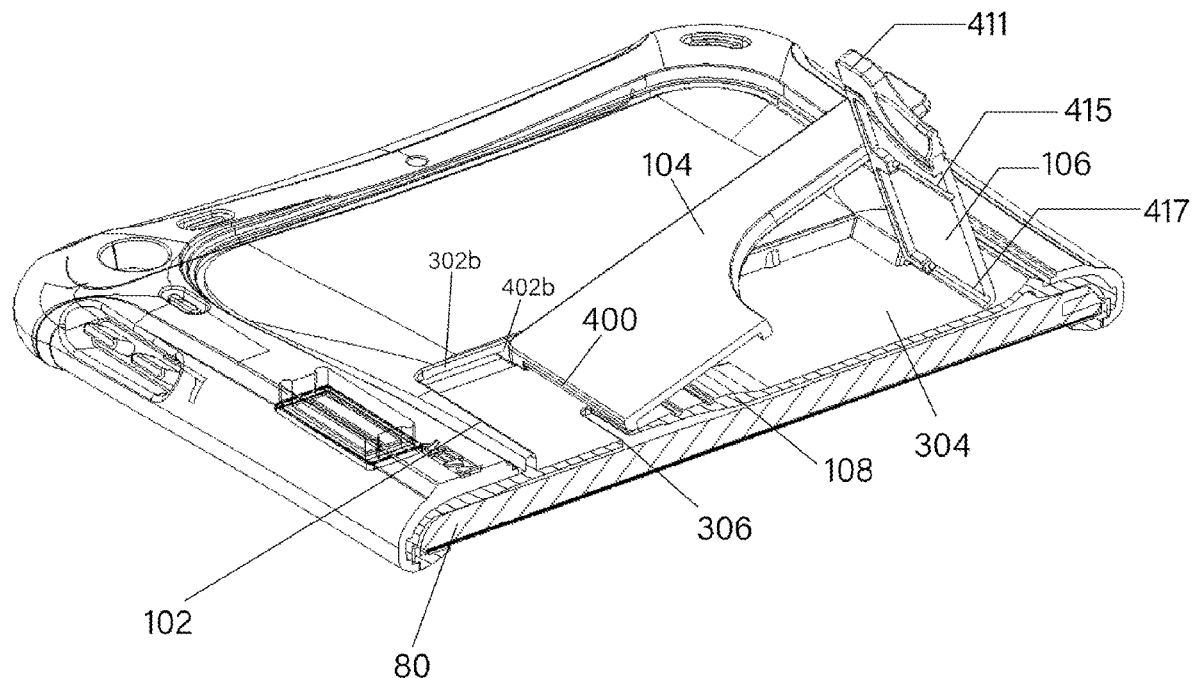
FIG. 5 is a perspective sectional view along a sagittal plane (along line 5-5 in FIG. 1) of the case with the stand in an exemplary opened position.
Figure 6:
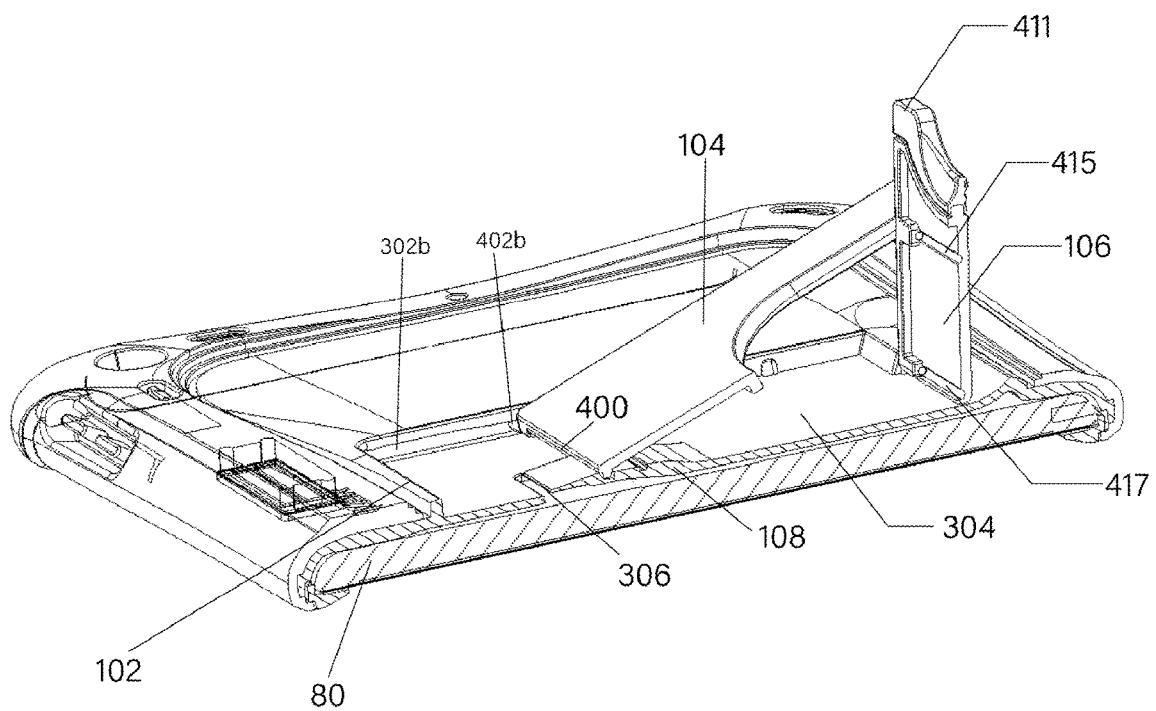
FIG. 6 is perspective sectional view along a sagittal plane (along line 5-5 in FIG. 1) of the case with the stand in another exemplary opened position.

Two exemplary three-dimensional (3D) sectional views of the case and the stand assembly are shown in FIGS. 5 and 6. The case is fitted around a computing tablet 80 as an example. The sectional views are roughly taken along a sagittal plane marked between 5-5 in FIG. 1. When handle 411 is lifted upwards, second member 106 rotates with respect to the base of the housing recess 102 around shaft 417. The second member 106 also rotates with respect to the first member 104 around shaft 415. These two rotations simultaneously drag the first member 104 via peg 402b along track 302b. In opened configurations as illustrated in FIGS. 5 and 6, two members of the stand assembly, 104 and 106, and the base of the housing recess 304 form a triangle, which in turn props up the object it enclosed at an angle with respect to its resting surface, whether horizontally or vertically.

Figure 7:
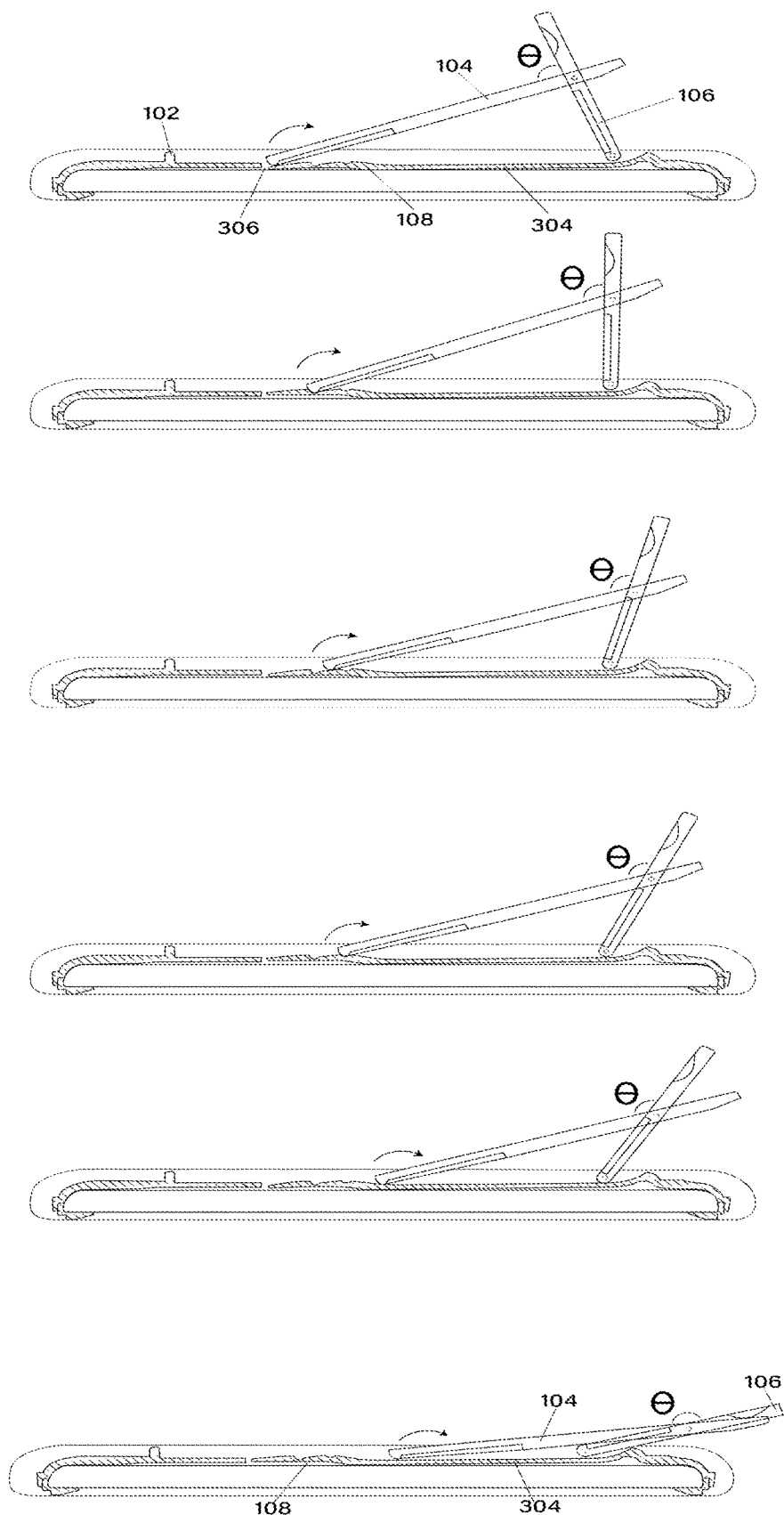
FIG. 7 illustrates a sequence of two-dimensional (2D) sectional views of the stand encompassing a range of opened positions.
Figure 12A:
FIGS. 12a and 12b are a side and a corresponding perspective view of the stand secured at an end position.

FIG. 7 illustrates a sequence of two-dimensional (2D) sectional views of the stand encompassing a range of opened positions. Angle theta (θ) between two members of the stand assembly, 104 and 106, comprises a range from 0 degree (closed configuration shown in FIG. 2) to slightly more than 175 degrees, which was shown in the bottom figure in FIG. 7. We refer to the stand assembly in this configuration as in its full extension. An upward facing example of the stand assembly in full extension is also shown in FIG. 12a.

A stand assembly covering a range from 0 to 175 degrees is disclosed above. The stand assembly, however, also needs to be stopped and secured at various locations within the range, so that a surface it supports can be fixed at any angle as desired. This function is achieved via an island or a bulge 108, configured around a central region on the base surface 304 of the housing recess 102. Enlarged cross sectional views of the island region are illustrated in FIGS. 8a and 8b. FIG. 8a shows a 2D sagittal plane view along line 5-5 from FIG. 1. FIG. 8b shows a 2D transversal plane view along 9-9 from FIG. 3. Sectional views of the island with respect to the base surface 304, to the housing recess 102, as well as to the entire case 100 can be appreciated in FIGS. 5-7, and 9.

For an exemplary rectangular shaped island 108, only one of its four edges is connected to, or as a natural extension of the base surface 304 as shown in FIG. 8a. A gap 306 is configured to surround the rest of the edges of the island 108 (FIG. 3). For instance, in a sagittal view in FIG. 8a, gap 306 is on the left edge side of the island that opposes the connected portion on the right. In a transversal view in FIG. 8b, gap 306 is on both side edges separating the island 108 from the base surface 304. Gap 306 allows the island 108 some freedom of movement to deviated from a coplanar position in relation to the base surface 304. Directions of movements are illustrated via arrows in FIGS. 8a and 8b. The island comprises some thickness greater than that of the base surface 304, and takes a profile of a gradual mound or a bulge with gentle sloping towards its edges.

As illustrated in FIGS. 5-7, the first member 104 of the stand assembly 110 slides along sidetracks 302a and 302b via a pair of end pegs 402a and 402b. Top edge 400 of the first member 104 therefore, moves across the base surface 304 of the housing recess 102, and also over the island 108. FIG. 7 illustrates a sequence of the stand assembly's locations encompassing the entire top surface of the island 108, all the way to its full extension position.

Island 108's dimensions in length, width, thickness, as well as its sloped mound profile and gap surrounded configuration, all contribute to providing tension against the top edge 400 of the first member 104 as it moves across the island. Since both end pegs 402a and 402b are restricted within sidetracks 302a and 302b, the top edge 400 of the first member 104 has to push against and over the island during its movement across. Surrounding gap 306 provides the island 108 an ideal flexible configuration to push back and to assert tension in return.

Surface of island 108, opposing top edge 400 of the first member 104, can be configured with a roughed texture to increase friction. In principle, friction alone is enough to stop and to secure the stand assembly at any desired angle. Rough texture, however, can become smoother over time, as one repeatedly open and close the stand over the island, thus reducing its efficacy. FIGS. 10-16 introduce several alternative embodiments to assist the securing of the stand assembly.

Figure 10:
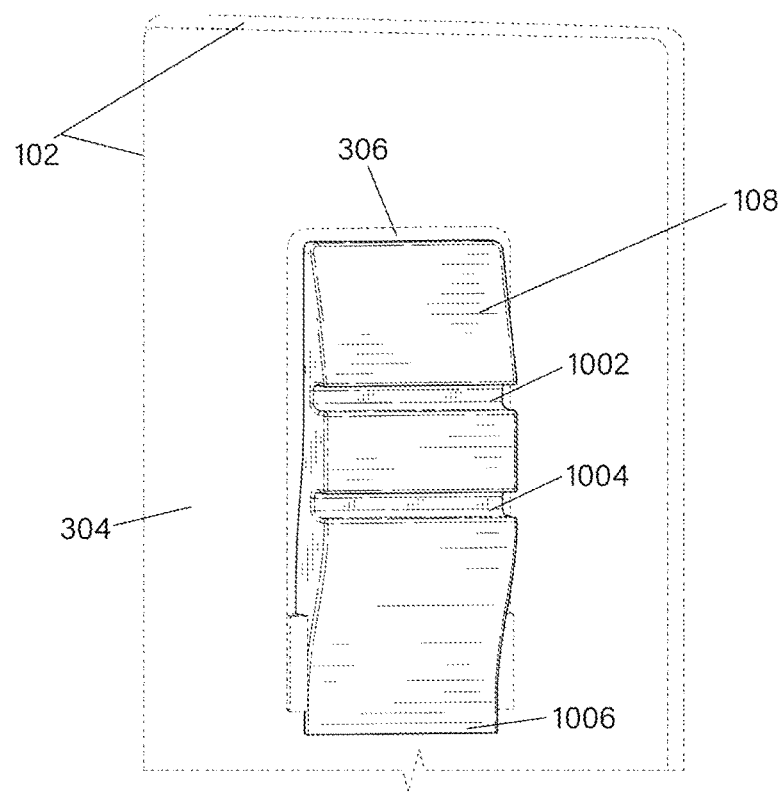
FIG. 10 is an enlarged perspective view of the island by itself.
Figure 12B:
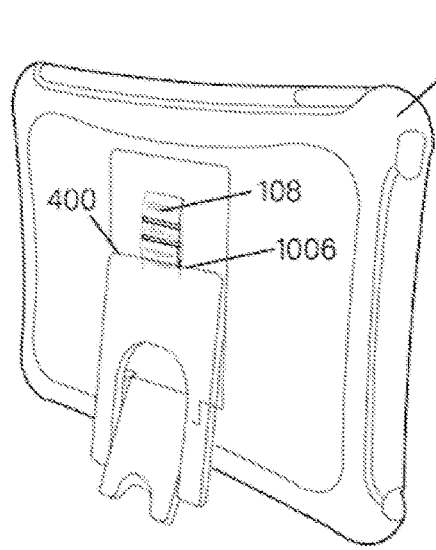
Figure 13A:
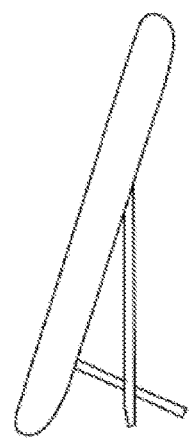
FIGS. 13a and 13b are a side and a corresponding perspective view of the stand secured at a second anchoring slot.
Figure 13B:
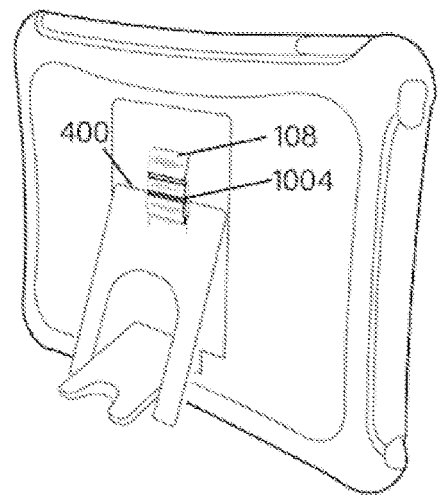
Figure 14A:
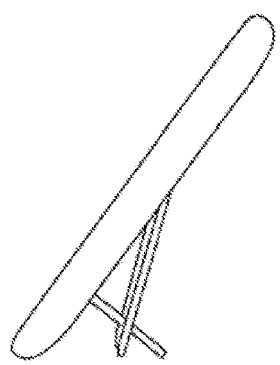
FIGS. 14a and 14b are a side and a corresponding perspective view of the stand secured at a first anchoring slot.
Figure 14B:
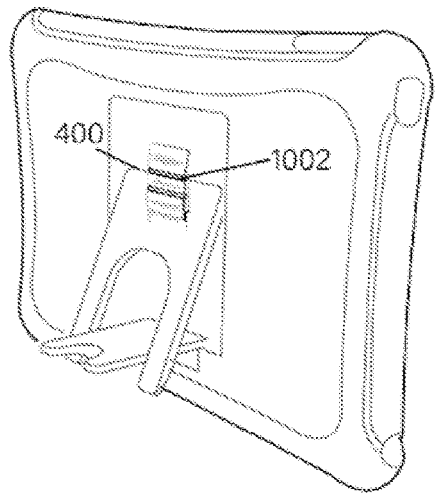

FIG. 10 is an enlarged perspective view of an island 108 in 3D. A majority of the island's perimeter is surround by a gap 306, separating its main body from the base surface 304 in a housing recess 102. Receiving slots 1002 and 1004 are configured horizontally across the tops surface of the island. The receiving slots are also configured in its dimensions to couple with an optional snap 402c along top edge 400 of the first member 104 (as illustrated in FIG. 4). Location 1006 marks an end position of the stand assembly 110 while in its full extension. FIGS. 12-14 illustrate several exemplary orientations of the case 100 in correspondence with the stand assembly 110, when it is secured into various receiving slots.

Figure 11:
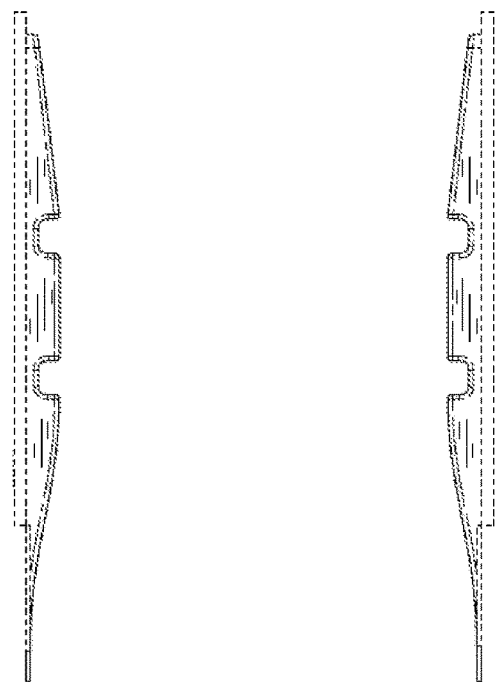
FIG. 11 shows a left and a right side views thereof.
Figure 15A:
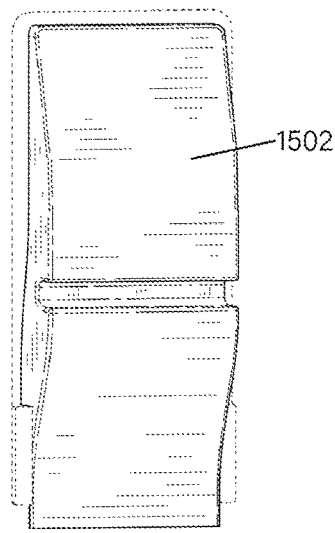
FIGS. 15a and 15b illustrate an island with a single or a plurality of anchoring slots.
Figure 15B:
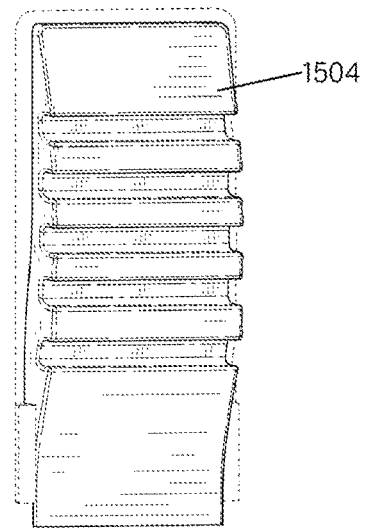
Figure 16A:
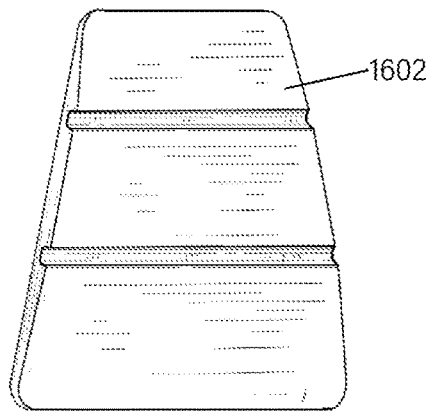
FIGS. 16a, 16b, and 16c illustrate exemplary variations in shape for an island.
Figure 16B:
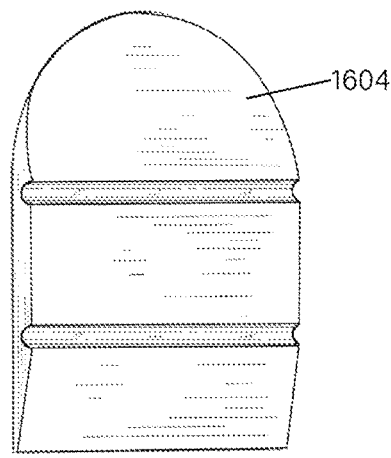
Figure 16C:
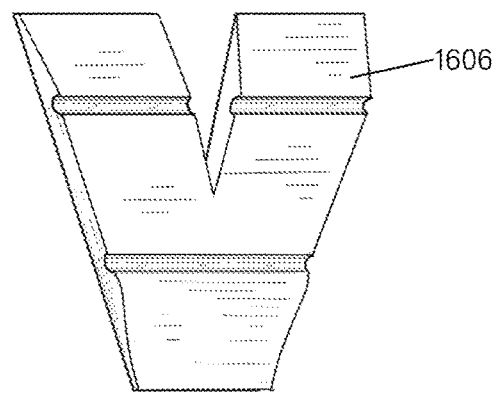

Left and right side profiles of the island 108 with receiving slots can be viewed in FIG. 11. Although the left and right side of the island are illustrated as flat surfaces in this particular example, they can certainly be configured with gradual slop as well, similar to the other two sides of the island. FIGS. 15a and 15b shows a comparison of a single receiving slot vs. 5 receiving slots on an island. The number of receiving slot should not be construed as a limiting factor. FIGS. 16a, 16b, and 16c illustrate a variation of islands in different shapes. The island can comprise subunits that are not necessarily continuous, such as shown with a two-prong V shape in FIG. 16c. Generally speaking, so long as the purpose and functionality of the island is met to secure a stand assembly, the exact shape of the island, arrangement of the receiving slots in continuity or not, or the number of receiving slots available can vary, based on need or for esthetic purpose.

The island 108, as well as the rest of the protective case and stand assembly can be manufactured with materials that are strong, light, and somewhat flexible. Materials suitable for the present disclosure may include, but not limited to Thermoplastic Urethanes (TPU) and Thermoplastic Elastomer (TPE), which are know for resisting wear and fading, and are relatively light in weight. A mixture of Acrylonitrile Butadiene Styrene (ABS) plastic and Polycarbonate (PC) can also be used. TPU, TPS, and Silicon can also be used to provide shock resistance, since they are slightly softer.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to achieve the desired features of the present disclosure. Also, a multitude of different constituent module names other than those depicted herein can be applied to the various partitions.

Although the disclosure is described above in terms of various exemplary embodiments and implementations, it should be understood that the various features, aspects and functionality described in one or more of the individual embodiments are not limited in their applicability to the particular embodiments with which they are described, but instead can be applied, alone or in various combinations, to one or more of the other embodiments of the disclosure, whether or not such embodiments are described and whether or not such features are presented as being a part of a described embodiment. Thus the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A protective case for a computing device, comprising:
   a protective rim configured to enclose and to capture at least a portion of the computing device's main body and its perimeter;
   a recess on a back side of the case to house a stand assembly, which transitions among a completely collapsed configuration and a plurality of deployed configurations;
      the stand assembly comprises a first member with an upper edge encompassing an entire width of the recess, two end portions of the upper edge are configured to latch onto and slide within corresponding tracks along both side walls of the recess at a first region; a second member rotatably coupled with the first member and is rotatably anchored onto sides of the recess at a second region opposing that of the first region;
      the recess further comprises an island situated around a central region along its base surface, with a slit gap encircling a majority of the island's circumference;
   in the completely collapsed configuration, rotational angle between the first and second members returns to zero, and both members are housed within the recess;
   in the plurality of deployed configurations, the end portions of the upper edge of the first member slide along the side walls so that a central portion of the upper edge transitions among a plurality of receiving positions over the island.

2. The protective case for a computing device of claim 1, wherein the slit gap encircles a majority circumference of the island, separating it from the base surface of the recess, except at a preset location where the island is connected to the base surface of the recess.

3. The protective case for a computing device of claim 1, wherein the island takes a profile of a mound with a preset thickness in its central region greater than that of the base surface of the recess, and gradually tapers thin towards its edges.

4. The protective case for a computing device of claim 1, wherein the plurality of receiving positions are configured in shapes of receiving slots, the receiving slots are in parallel to one another, as well as in parallel to the upper edge of the first member of the stand assembly.

5. The protective case for a computing device of claim 1, wherein the upper edge of the first member of the stand assembly further comprises a snap with a profile in complimentary to that of the receiving positions.

6. The protective case for a computing device of claim 1, wherein the first and second members of the stand assemble are coupled to rotate with respect to one another via a shaft.

7. The protective case for a computing device of claim 1, wherein the second member of the stand assembly further comprises a handle.

8. The protective case for a computing device of claim 1, wherein the rotational angle between the first and the second member of the stand assembly is between 0 to 175 degrees.

9. The protective case for a computing device of claim 1, wherein the island further comprises subunits and clusters.

10. A protective case, comprising:
    a protective rim configured to enclose and to capture at least a portion of an object's main body and its perimeter;

a recess on a back side of the case to house a stand assembly, which transitions among a completely collapsed configuration and a plurality of deployed configurations;

the stand assembly comprises a first member with an upper edge encompassing an entire width of the recess, two end portions of the upper edge are configured to latch onto and slide within corresponding tracks along both side walls of the recess at a first region; a second member rotatably coupled with the first member and is rotatably anchored onto sides of the recess at a second region opposing that of the first region;

the recess further comprises an island situated around a central region along its base surface, with a slit gap encircling a majority of the island's circumference;

in the completely collapsed configuration, rotational angle between the first and second members returns to zero, and both members are housed within the recess;

in the plurality of deployed configurations, the end portions of the upper edge of the first member slide along the side walls so that a central portion of the upper edge transitions among a plurality of receiving positions over the island.

11. The protective case of claim 10, wherein the slit gap encircles a majority circumference of the island, separating it from the base surface of the recess, except at a preset location where the island is connected to the base surface of the recess.

12. The protective case of claim 10, wherein the island takes a profile of a mound with a preset thickness in its central region greater than that of the base surface of the recess, and gradually tapers thin towards its edges.

13. The protective case of claim 10, wherein the plurality of receiving positions are configured in shapes of receiving slots, the receiving slots are in parallel to one another, as well as in parallel to the upper edge of the first member of the stand assembly.

14. The protective case of claim 10, wherein the upper edge of the first member of the stand assembly further comprises a snap with a profile in complimentary to that of the receiving positions.

15. The protective case of claim 10, wherein the first and second members of the stand assemble are coupled to rotate with respect to one another via a shaft.

16. The protective case of claim 10, wherein the second member of the stand assembly further comprises a handle.

17. The protective case of claim 10, wherein the rotational angle between the first and the second member of the stand assembly is between 0 to 175 degrees.

18. The protective case of claim 10, wherein the island further comprises subunits and clusters.

* * * * *